United States Patent [19]

Connolly

[11] E Re. 31,191

[45] Reissued Mar. 29, 1983

[54] ELASTIC PLASTIC NETTING, AND PALLET LOAD WRAPPING THEREWITH

[75] Inventor: Hugh R. Connolly, Minnetonka, Minn.

[73] Assignee: Bemis Company, Inc., Minneapolis, Minn.

[21] Appl. No.: 228,773

[22] Filed: Jan. 27, 1981

Related U.S. Patent Documents

Reissue of:

[64] Patent No.: 4,136,501
Issued: Jan. 30, 1979
Appl. No.: 840,892
Filed: Oct. 11, 1977

[51] Int. Cl.[3] ..... B32B 5/04; B65B 11/00; B65D 19/00; B66C 1/12

[52] U.S. Cl. ..... 206/386; 53/461; 206/597; 264/DIG. 18; 428/107; 428/215; 428/231; 428/255; 428/296; 428/339

[58] Field of Search ..... 53/461, 559; 206/386, 206/597; 204/DIG. 18; 428/107, 255, 296, 231, 215, 339

[56] References Cited

U.S. PATENT DOCUMENTS

| | | | |
|---|---|---|---|
| 2,919,467 | 1/1960 | Mercer | 18/12 |
| 3,029,174 | 4/1962 | Schultheiss | 156/167 |
| 3,085,292 | 4/1963 | Kindseth | 18/55 |
| 3,089,804 | 5/1963 | Gutierrez | 156/167 |
| 3,495,375 | 2/1970 | Burhop et al. | 53/30 R |
| 3,547,457 | 12/1970 | Langer | 206/597 |
| 3,744,529 | 7/1973 | Jorda et al. | 428/107 |
| 3,825,113 | 7/1974 | Kramer et al. | 206/386 |
| 3,867,242 | 2/1975 | Miller | 428/107 |
| 3,867,806 | 2/1975 | Lancaster et al. | 53/30 R |
| 3,945,493 | 3/1976 | Cardinal | 206/386 |
| 3,961,459 | 6/1976 | Wolske | 53/30 R |
| 3,986,611 | 10/1976 | Dreher | 206/597 |
| 4,050,220 | 9/1977 | Lancaster et al. | 53/184 R |
| 4,067,174 | 1/1978 | Goldstein | 53/184 R |

FOREIGN PATENT DOCUMENTS

| | | | |
|---|---|---|---|
| 2207573 | 8/1973 | Fed. Rep. of Germany . | |
| 2522113 | 11/1976 | Fed. Rep. of Germany | 206/597 |

OTHER PUBLICATIONS

Conwed Oriented Plastic Netting, Form 642, Conwed Corporation, Plastics Division, Minneapolis, Minnesota 55414.

Conwed Unoriented Plastic Netting, Form 644, Conwed Corporation.

Conwed Plastic Netting Products, Form 650R-774, Conwed Corporation.

Conwed Plastic Netting Products, Form 650-PL, Conwed Corporation.

*Primary Examiner*—James C. Cannon

*Attorney, Agent, or Firm*—Senniger, Powers, Leavitt and Roedel

[57] ABSTRACT

Plastic netting [particularly] for wrapping pallet loads, securely to hold the load on the pallet without heat-shrinking of the netting and providing for ventilation of the load, i.e., egress of air from the load or ingress of air to the load; a method of wrapping the load with such netting for such purpose; and the resultant wrapped pallet load.

28 Claims, 10 Drawing Figures

FIG. 6
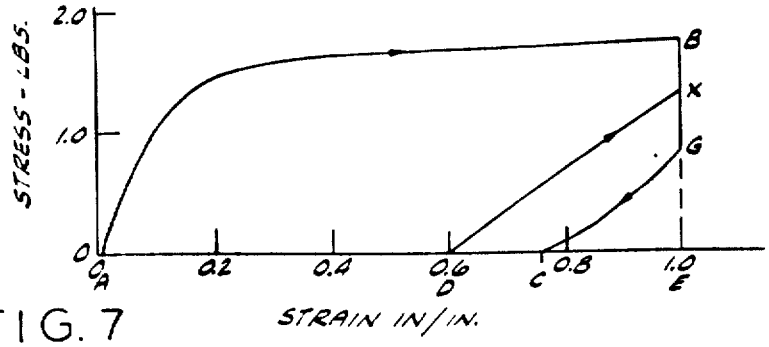
FIG. 7
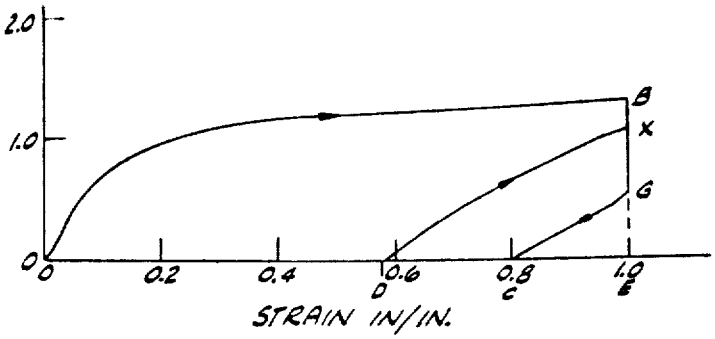
FIG. 8
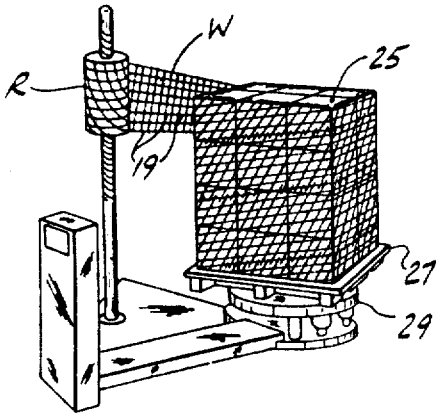
FIG. 9
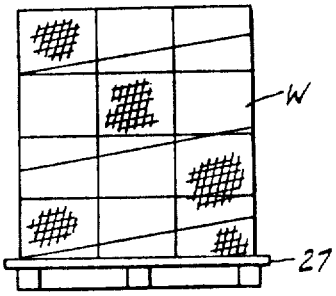
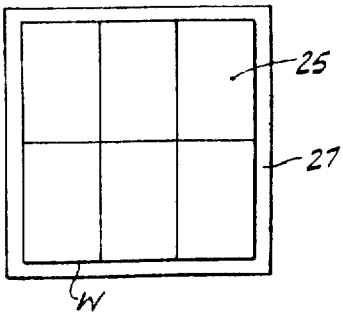
FIG. 10

ELASTIC PLASTIC NETTING, AND PALLET LOAD WRAPPING THEREWITH

Matter enclosed in heavy brackets [ ] appears in the original patent but forms no part of this reissue specification; matter printed in italics indicates the additions made by reissue.

BACKGROUND OF THE INVENTION

This invention relates to plastic netting and its use in wrapping loads on pallets.

The invention is especially concerned with the wrapping of loads on pallets, more particularly a load such as a stack of filled bags or boxes on a pallet. Wrapping such pallet loads to stabilize them on the pallet, i.e., to maintain them intact on the pallet, has become widespread practice. Heretofore, various modes of wrapping have been employed for this purpose. One such mode (referred to as stretch wrapping) involves the wrapping of stretchable plastic film around the load, and stretching of the film as disclosed in U.S. Pat. No. 3,867,806, for example. Another mode (referred to as shrink wrapping) involves the wrapping of heat-shrinkable plastic film around the load or the placement of a cover (a bag) of such film as a wrapping over the load, and heating the wrapping as by conveying the pallet with the enwrapped load thereon through an oven (which may be referred to as a shrink tunnel) for heating the wrapping to cause it to shrink on the load. Each of these modes has the distinct disadvantage insofar as many loads are concerned that air cannot circulate through the wrapping. Thus, for example, a load of bags of flour, which bags are palletized in a warm condition, generally cannot be stretch wrapped or shrink wrapped because of condensation of moisture within the wrapping when the bags cool, causing damage to the product. Further by way of example, a load of fresh produce in ventilated packages, the produce requiring ventilation, cannot be stretch or shrink wrapped. A mode of wrapping products utilizing a sleeve of heat-shrinkable plastic netting so as to provide ventilation has been proposed—see U.S. Pat. No. 3,945,493—but this requires heat-shrinking of the sleeve by passing the pallet with the ensleeved load thereon through an oven, and this may damage certain products (e.g., fresh produce) or be dangerous in the case of certain products (e.g., presenting a fire hazard), as in the case of flour. A fourth mode has involved banding the load with steel or plastic strapping. Conventional steel and plastic strapping has very little elasticity and consequently when applied to a pallet load tends to loosen and cease holding the load securely as the load, in the case of flowable product in bags, compacts or, in the case of wet produce in corrugated cardboard cartons, the carton walls weaken and collapse. While both the heat-shrunk netting and strapping provide for air circulation, they do not hold many pallet loads securely through the numerous handlings the pallet may receive.

SUMMARY OF THE INVENTION

Among the several objects of this invention may be noted the provision of a plastic netting especially for use in wrapping pallet loads, adapted securely to hold the load substantially intact on the pallet, without requiring any heat-shrinking of the netting so that it is safe and convenient to use, and adapted to provide for ventilation of the load (i.e., egress of air from the load and ingress of air to the load through the netting); the provision of a method of wrapping a pallet load utilizing the netting of the invention to hold the load substantially intact on the pallet with the load adequately ventilated, without requiring heat-shrinking of the netting; the provision of a wrapped pallet load with the load being adequately ventilated while at the same time being securely wrapped to hold it substantially intact on the pallet without heat-shrinking; and the provision of such netting and method enabling economical, safe ventilated wrapping of a pallet load, and the resultant enwrapped load.

In general, plastic netting of this invention *for stretch-wrapping pallet loads* is in the form of a continuous web having strands extending generally longitudinally of the web spaced at intervals transversely of the web and strands extending generally transversely of the web spaced at intervals longitudinally of the web. The netting is formed of a thermoplastic synthetic resin material. Its longitudinal and transverse strands are integrally joined at the intersections thereof. The longitudinal strands are elastic to the extent of being stretchable at least 100% when stretched at the rate of 1000% per minute while retaining a substantial degree of elasticity over a relatively long period of time *after having been wrapped around a pallet load with the longitudinal strands extending in the direction of wrap and stretched as the netting is wrapped around the load to bind the load.*

The method of this invention for stabilizing a load on a pallet generally comprises wrapping plastic netting of this invention around the load with the longitudinal strands of the netting extending in the direction of wrap and, as the netting is wrapped around the load, stretching the longitudinal strands of the netting at least 25%, and securing the netting in place on the load with the longitudinal strands so stretched, thereby to maintain the load bound in place on the pallet, the netting allowing for ventilation of the load.

A pallet load of this invention is a load wrapped with plastic netting of this invention with the longitudinal strands of the netting extending in the direction of wrap and stretched at least 25%, thereby maintaining the load bound in place on the pallet while allowing for ventilation of the load. Other objects and features will be in part apparent and in part pointed out hereinafter.

BRIEF DESCRIPTION OF THE DRAWINGS

FIGS. 4–7 are stress-strain charts showing stress retention and tensile strain recovery characteristics of a longitudinal strand of each of four different synthetic resin materials extruded to form the netting;

FIG. 8 is a perspective showing the wrapping of a load on a pallet with plastic netting of this invention;

FIG. 9 is a side elevation of the wrapped pallet load; and

FIG. 10 is a plan of FIG. 9.

Corresponding reference characters indicate corresponding parts throughout the several views of the drawings.

DESCRIPTION OF THE PREFERRED EMBODIMENTS

Figure 1:
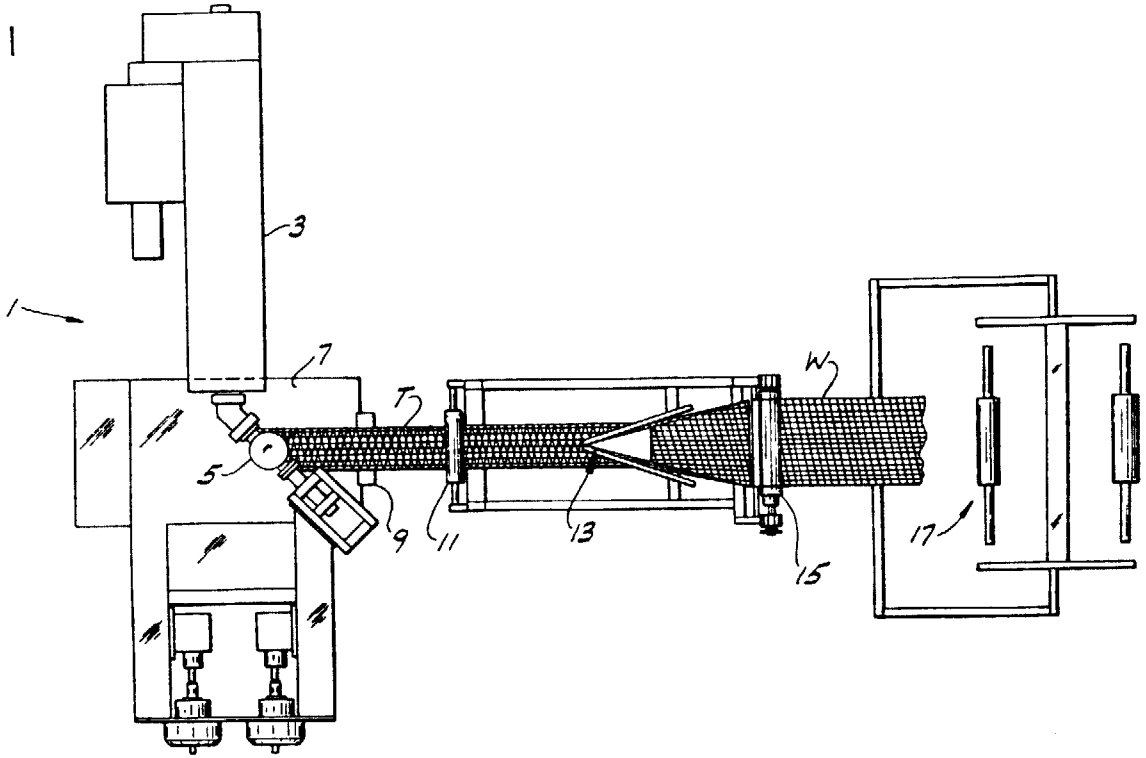
FIG. 1 is a plan of apparatus for extruding plastic netting of this invention, showing the netting extruded in the form of a tube, and the tube slit longitudinally and opened up to form a web.

Referring to the drawings, first to FIG. 1, there is generally indicated at 1 apparatus for extruding plastic netting in the form of a tube with the netting having strands extending generally longitudinally of the tube and strands extending circumferentially of the tube. This apparatus, which may correspond generally to the netting extrusion apparatus shown in U.S. Pat. Nos. 2,919,467 and 3,089,804, basically comprises an extruder 3 comprising a heated barrel having an extruder screw rotatable therein, for heating a thermoplastic synthetic resin material to a plastic state and feeding the resin in that state out through one end of the barrel to and through a set of netting extrusion dies 5. The latter function to extrude netting in the form of a tube with this netting having the stated longitudinal and circumferential strands, these strands being integrally joined at the intersections thereof. The tube is extruded downwardly into a water bath 7 for quenching (cooling) it, and is then flattened between a pair of draw rolls in the bath. The flattened tubing, which is indicated at T in FIG. 1, is pulled out of the bath over a guide roll 9, fed through a pair of guide rolls indicated at 11, longitudinally slit by a slitter at 13 and opened up into a flat web W of the netting. The flat web passes through a set of draw rolls 15, which draw the web W and tube T forward, and is wound on a core, e.g., a cardboard core, in a winder indicated generally at 17.

The set of netting extrusion dies 5 comprises an inner die and an outer die as in U.S. Pat. Nos. 2,919,467 and 3,089,804, with the outer die continuously rotatable and the inner die stationary as described in U.S. Pat. No. 2,919,467 (column 7, lines 43–45), so that the extruded tube T of netting has longitudinal strands and circumferential strands extending helically of the tube.

Figure 2:
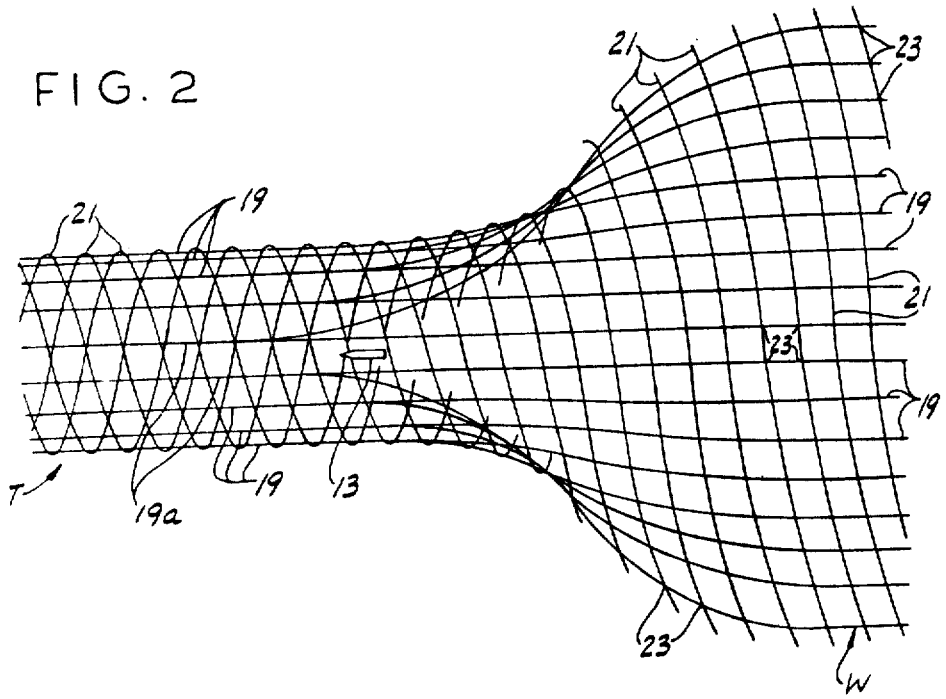
FIG. 2 is a view on a larger scale than FIG. 1 showing the slitting and opening up of the tube to form a web of plastic netting of this invention.

FIG. 2 shows the tube T, the slitter 13, and the flat continuous web W into which the tube is slit on a larger scale than FIG. 1. The longitudinal strands of the tube are designated 19. These become longitudinal strands of the web, extending generally longitudinally of the web spaced at intervals transversely of the web. The circumferential strands of the tube are designated 21. They become transverse strands of the web, extending generally transversely of the web spaced at intervals longitudinally of the web. In the tube and in the web, the longitudinal strands 19 and the transverse strands 21 are integrally joined at the intersections 23 thereof.

In accordance with this invention, the longitudinal strands 19 of the web are elastic to the extent of being stretchable at least 100% when stretched at the rate of 1000% per minute while retaining a substantial degree of elasticity over a relatively long period of time to the extent of retaining at least 30% of the initial stress and having a tensile strain recovery of at least 30% as determined by an adaptation of the ASTM Standard Method of Test for Elastic Properties of Textile Fibers No. D1774-72.

Since the transverse strands 21 are formed in the extrusion process of the same thermoplastic synthetic resin material as the longitudinal strands, the transverse strands will generally have the same stretchability characteristic and tensile strain recovery characteristic as the longitudinal strands, but these characteristics are generally not critical insofar as the transverse strands are concerned. The stretchability and tensile strain recovery characteristics of the longitudinal strands are important, however, for effectively stabilizing a load on a pallet through the numerous handlings the pallet with the load thereon may receive.

The netting may be formed of any thermoplastic synthetic resin material which is extrudable to form netting and which will provide the requisite stretchability and tensile strain recovery characteristics as specified above. It may be extruded of such polyolefins as will provide these characteristics. The material may be a single polyolefin or a blend of polyolefins. The presently preferred material for the netting is a blend of about 90% polybutylene and 10% polypropylene by weight. Other proportions may be suitable. Another suitable blend of polyolefins is a blend of low density polyethylene and high density polyethylene, preferably about 75%/25% by weight. A blend of ethylene vinyl acetate and polypropylene, preferably about 90%/10% by weight, or ethylene vinyl acetate per se may be used. Other possible materials are polybutylene per se, low density polyethylene per se, ethylene acrylic acid copolymers, and a blend of ethylene vinyl acetate with high density polyethylene.

In the web W, the diameter of the strands (both the longitudinal and transverse strands) may range from about 0.010 inch to about 0.100 inch. The transverse strands may be of smaller diameter than the longitudinal strands, their principal functions being as bridging connections between the longitudinal strands and providing a vertical restraint to the pallet load when the load is subject to vertical movement as in the case of bouncing or vibrating in the course of transporting on a truck or rail car. In this respect, the diameter of the transverse strands may be about 50% to 75%, for example, of the diameter of the longitudinal strands. Preferred ranges are about 0.030–0.050 inch in diameter for the longitudinal strands and 0.020–0.040 inch for the transverse strands. The width of the web may range generally from about 6 inches to about 70 inches. The spacing of the longitudinal strands transversely of the web may range from about ¼ inch to about 10 inches, and the spacing of the transverse strands longitudinally of the web may range from about 74 inch to about 10 inches. In a preferred embodiment, the web W is 20 inches wide, with 17 longitudinal strands spaced at 17/20 inch intervals, and with the transverse strands spaced at 1¾ inch intervals. The longitudinal strands are about 0.034–0.037 inch in diameter and the transverse strands are about 0.025 inch in diameter.

In the web W as shown in FIG. 2, the transverse strands, having been derived as circumferential strands of the tube T, are not at 90° to the longitudinal strands, but are angled slightly off 90°. However, it is contemplated that the angle of the transverse strands to the longitudinal strands may range from 90° to 45°.

The following examples illustrate the invention.

EXAMPLE 1

A blended mixture consisting of 90% polybutylene and 10% polypropylene by weight was extruded via the extruder 3 and the set of dies 5 corresponding to the extruder and set of dies shown in U.S. Pat. No. 2,919,467. The inner die of the set (corresponding to the die member 12 shown in U.S. Pat. No. 2,919,467) was held stationary for the extrusion of the longitudinal strands in the longitudinal direction of the tube T of netting (sometimes also referred to as the "machine direction"). The inner die diameter was 3¾ inches, and it had 17 extrusion grooves (corresponding to grooves 14 of U.S. Pat. No. 2,919,467) spaced around its periphery at generally equal intervals so that the tube of netting was extruded with 17 longitudinal strands on a 3¾ inch tube diameter. The hauloff speed for the tubing, as determined by the speed of the draw rolls 15, was 20 feet per minute, and the outer die of the set (corresponding to the die member 6 shown in U.S. Pat. No. 2,919,467) was rotated around the inner die at 30 rpm. It had 17 extrusion grooves corresponding to the inner die. The 3¾ inch diameter tubing issuing from the dies passed downwardly over a mandrel 6¼ inches in diameter, (similar to mandrel 21a shown in U.S. Pat. No. 3,089,804) thereby expanding the 3¾ inch diameter tubing to 6¼ inch diameter tubing via stretching (while still in plastic condition) of the transverse strands. The extrusion grooves in the inner and outer dies were such that the longitudinal strands and transverse strands issuing therefrom were about 0.034–0.037 inch in diameter, the transverse strands being stretched and thinned on account of the passage over the mandrel to about 0.025 inch in diameter. The slitter 13 was positioned to extend between two adjacent longitudinal strands 19, these being specially designated 19a in FIG. 2, so as to cut through the transverse strands 21 between these two longitudinal strands 19a as the netting traveled forward (toward the right as illustrated in FIGS. 1 and 2) from the rolls 11 to the draw rolls 15. Following the slitting at 13, the tube was opened up to form the web W which, after passing through the draw rolls 15, was wound up on a core in the winder 17, the latter being traversed axially back and forth for traverse winding of the web W, the purpose of the traverse being to distribute the longitudinal strands axially one way and the other with respect to the core so that they did not wind up convolutely.

The web W formed as above described was 20 inches wide, having 17 longitudinal strands spaced at 17/20 inch intervals, and transverse strands spaced generally at 1¾ inch intervals. The longitudinal strands were about 0.034–0.037 inch in diameter and the transverse strands were about 0.025 inch in diameter. The process as described produced 67 lineal feet of the 20 inch wide web per pound of the 90% polybutylene/10% polypropylene material.

Figure 4:
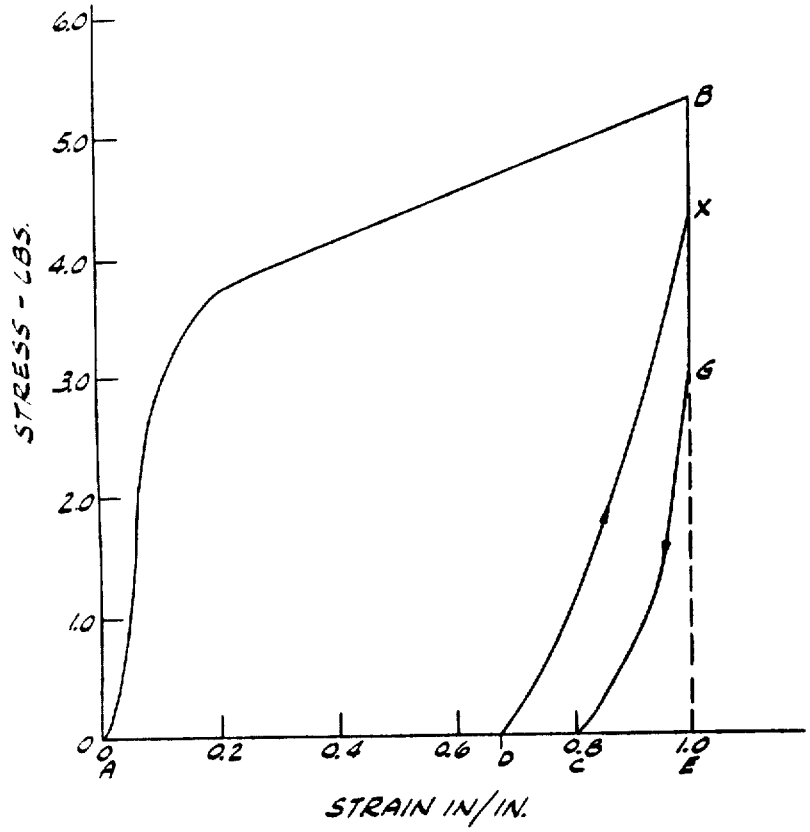

A length of a longitudinal strand 19 of the 90% polybutylene/10% polypropylene material was tested according to an adaptation of the ASTM Standard Method of Test for Elastic Properties of Textile Fibers No. D1774-72, the test results being plotted on the chart shown in FIG. 4 (the form of this chart corresponding to the chart shown in FIG. 1 of the ASTM publication No. D1774-72, wherein the horizontal coordinate represents the strain (inches of stretch of the test specimen per inch length of the specimen) and the vertical coordinate represents the pounds of stress in the test specimen at the various amounts of strain. In carrying out the test, the test specimen (which had a total length of about 5 inches) was clamped in the jaws of the testing machine with the jaws 2 inches apart so that the effective length of the specimen under test was 2 inches. Then the jaws were relatively extended to stretch the specimen at the rate of 1000% per minute and the stretching was continued until the specimen had been extended 100% to 4 inches. The stress/strain relationship for this phase of the test is represented by the line A–B on the chart, showing a stress in the specimen of about 5.25 lbs. at 100% stretch (at point B). The specimen was held at 100% stretch for sixteen hours, during which time the stress relaxed from point B to point G on the chart, point G being at 2.95 lbs. Then, in accordance with the ASTM Test No. D1774-72, the jaws of the testing machine were allowed to return to their initial separation (i.e., 2 inches), the stress/strain relationship for this phase of the test being represented by the line G–C on the chart. This shows that the length of the specimen decreased from its 4 inch stretched length to a length of about 0.8 of its stretched length, which is about 3.2 inches. The specimen was then allowed to rest at zero stress for one minute, and then the jaws were again extended to again stretch the specimen at the rate of 1000% per minute back to the 4 inch length, the stress/strain relationship for this phase of the test being represented by the line A—D—X, showing that the stress remained at zero until the jaws reached point D, which is at about 0.68 inch on the chart, and then rose to about 4.30 lbs. at point X where the specimen reached the 4 inch stretched length.

On the chart, E denotes the point of one inch strain per one inch of initial jaw separation. The stress retention characteristic of the strand of the 90% polybutylene/10% polypropylene material then is the ratio of the length of the line G–E, which is the stress in the specimen after the sixteen hour relaxation period, to the length of the line B–E which is the stress in the specimen at 100% stretch before the sixteen hour relaxation period, and this is 2.95/5.25=0.562 or 56.2%. The tensile strain recovery of the strand is the ratio of the length of line D–E to the length of line A–E, and this is 0.32/1=0.32 or 32%.

Thus the longitudinal strands 19 of the netting extruded from the 90% polybutylene/10% polypropylene thermoplastic synthetic resin material were stretchable at least 100% when stretched at the rate of 1000% per minute while retaining a substantial degree of elasticity over a relatively long period of time (sixteen hours), having a stress retention factor of 56.2% and a tensile strain recovery of 32%.

EXAMPLE 2

A blended mixture consisting of 75% low density polyethylene and 25% high density polyethylene was extruded to form netting as in Example 1.

Figure 5:
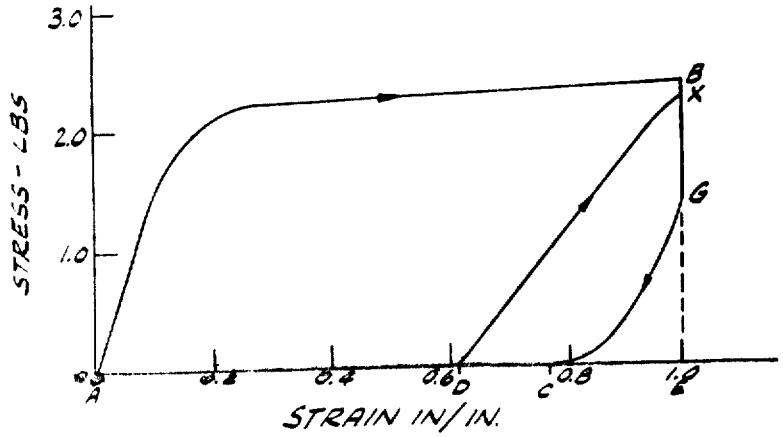

A length of a longitudinal strand 19 if the Example 2 netting was tested in the same manner as specified in Example 1, and the results of the test on the 75% low density polyethylene/25% high density polyethylene material of Example 2 are plotted on the chart of FIG. 5. As appears from this chart, the longitudinal strands of the Example 2 netting were stretchable at least 100% when stretched at the rate of 1000% per minute, and had a stress retention factor of 60% and a tensile strain recovery of 39% in the test with a 16 hour relaxation period.

EXAMPLE 3

A blended mixture consisting of 90% ethylene vinyl acetate and 10% polypropylene was extruded to form netting as in Example 1.

A length of a longitudinal strand 19 if the Example 3 netting was tested in the same manner as specified in Example 1, and the results of the test on the 90% ethylene vinyl acetate/10% polypropylene material of Example 3 are plotted on the chart of FIG. 6. As appears from this chart, the longitudinal strands of the Example 3 netting were stretchable at least 100% when stretched at the rate of 1000% per minute, and had a stress retention factor of 48% and a tensile strain recovery of 40% in the test with a 16 hour relaxation period.

EXAMPLE 4

100% ethylene vinyl acetate was extruded to form netting as in Example 1.

A length of a longitudinal strand 19 if the Example 4 netting was tested in the same manner as specified in Example 1, and the results of the test on the 100% ethylene vinyl acetate material of Example 4 are plotted on the chart of FIG. 7. As appears from this chart, the longitudinal strands of the Example 4 netting were stretchable at least 100% when stretched at the rate of 1000% per minute, and had a stress retention factor of 40% and a tensile strain recovery of 42% in the test with a 16 hour relaxation period.

Referring to FIG. 8, a web W of plastic netting of this invention is shown being wrapped around a load 25 on a pallet 27 for stabilizing the load on the pallet. The wrapping is carried out by means of any suitable pallet wrapping machine a number of which are on the market for stretch wrapping pallet loads (with stretch film). Generally, such a machine comprises a turntable 29 on which the loaded pallet is placed, this turntable being adapted for rotation with the loaded pallet thereon for wrapping around the load a web pulled from a supply roll R. As shown in FIG. 8, the web is one that is relatively narrow in relation to the height of the load and the machine includes means for traversing the roll R for spirally wrapping the web around the load. Braking means is provided for braking the roll R to tension the web thereby to stretch it as it is wound around the load. So-called spiral stretch wrap machines of this type include the Arenco Automatic Spiral Stretch Wrap Machine sold by Arenco Machine Co., Inc. of Teterboro, N.J., the Spiral LANRAPR Machine sold by Lantech, Inc. of Louisville, Ky., and the SIDEWINDER or the AVENGER Spiral Stretch-Wrap Machines of Infra Pak (Dallas) Inc. of Dallas, Tex.

The web W of netting shown in FIG. 8 is, for example, the 20 inch wide web described above. For wrapping it around the pallet load 25, the leading edge of the netting is suitably secured to the load, as by bunching it and inserting it between individual items of the load, or between the load and the top surface of the pallet, the pallet is rotated and the roll R traversed for spirally wrapping the netting around the load. As the netting is being wrapped, the roll R is braked so that the wrapping is carried out with the netting under such tension that the longitudinal strands 19 of the netting, which extend in the direction of wrap, are stretched to the desired degree in the range of 25% to 200%. On completion of the wrapping, the netting is secured in place on the load as by stapling or otherwise fastening it to itself and cutting it between the roll R and the load. Alternatively, the netting may be cut and its cut end bunched and threaded through an interstice of the netting with or without tying, for securing it in place. In securing the netting in place, the stretch of the longitudinal strands is preserved.

In a typical wrapping operation, utilizing an Infra Pak SIDEWINDER machine, a load 48 inches wide and 50 inches high on a pallet was wrapped with the netting of Example 1, with a tension setting of 50 on the machine, providing an elongation of about 110% of the longitudinal strands 19 of the netting. The wrapping involved taking about 7–7¼ turns around the load, 2 at the base of the load, then spiralling upward about 1½ turns, then taking 2 at the top, and spiralling down about 1½ turns. The operation started with a roll R about 10 inches in diameter wound on a 3 inch core, weighing about 12–13 lbs., containing about 80–820 feet of netting. This was provided for wrapping 15 loads, with about 7–7¼ wraps per load, i.e., 53–55 feet of the netting per load, stretched to about 116 feet per load. This amounted to about 0.88 lbs. of netting per load.

In another wrapping operation, the tension setting of the machine was changed to 60, providing an elongation of 150% of the longitudinal strands of the netting, and wrapping of each load with about 0.67 lbs. of netting in contrast to the 0.88 lbs. per load with 110% stretch.

FIGS. 9 and 10 illustrate the enwrapped load, in which longitudinal strands 19 of the netting, extending in the direction of wrap spirally around the load, are stretched at least 25%. They thereby bind the load in place on the pallet, and maintain it bound in place even though the stress in the stretched longitudinal strands may relax over a period of time (e.g., from B to G in 16 hours) and even though the load may tend to shift under the handling it receives.

While as above described the load on the pallet is spirally wrapped with the netting (which is 20 inches wide, for example), the netting may be used for the so-called full web type of wrapping wherein the width of the netting would approximate the height of the load, either by wrapping a single full-width web of the netting around the load in the manner disclosed for film in U.S. Pat. No. 3,867,806, or by the dual roll single wrap method in which the pallet load would be passed through a vertical wall of netting formed by two webs of netting from two separate rolls of netting on either side of the infeed conveyor of the dual roll single wrap apparatus.

Figure 3:
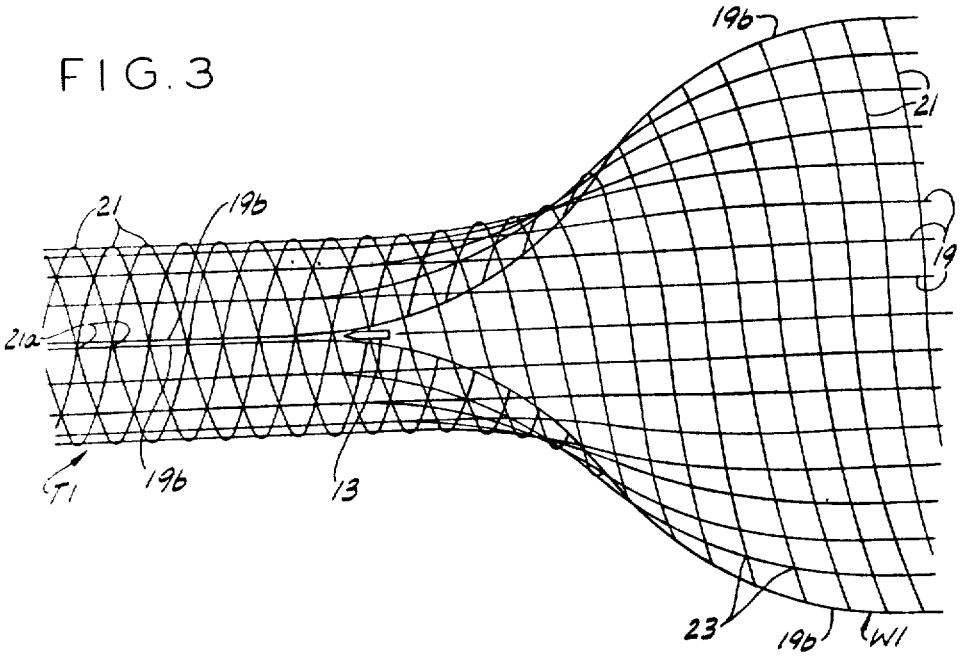
FIG. 3 is a view similar to FIG. 2 showing a modification in the extruded tube.

FIG. 3 illustrates a modification of the extruded net tube, which is designated T1, to have two closely spaced longitudinal strands which are designated 19b, the slitter 13 cutting through the short lengths 21a of transverse strands between these two closely spaced longitudinal strands. This provides longitudinal strands, more particularly the strands 19b, at the side edges of the web formed on opening up the tube, the web in FIG. 3 being designated W1 to distinguish it from the web W. The net tube of FIG. 3 may be extruded in the manner similar to that disclosed in U.S. Pat. No. 3,089,804, by having two closely spaced orifices in the stationary die for extrusion of the two closely spaced longitudinal strands 19b.

The netting may be extruded and bias-slit to form it into a web as in U.S. Pat. No. 3,557,268.

It is also contemplated that netting of this invention may be extruded in tubular form by means other than that shown in U.S. Pat. Nos. 2,919,467 and 3,089,804, or in flat form by means such as shown in U.S. Pat. No. 2,919,467 (FIGS. 6–8a) or in U.S. Pat. Nos. 3,252,181, 3,749,535, and 3,767,353 with stretching of the transverse strands of the netting to make them thinner than the longitudinal strands, if desired.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

What is claimed is:

[1. Plastic netting in the form of a continuous web having strands extending generally longitudinally of the web spaced at intervals transversely of the web and strands extending generally transversely of the web spaced at intervals longitudinally of the web, the netting being formed of a thermoplastic synthetic resin material, the longitudinal and transverse strands being integrally joined at the intersections thereof, the longitudinal strands being elastic to the extent of being stretchable at least 100% when stretched at the rate of 1000% per minute while retaining a substantial degree of elasticity over a relatively long period of time.]

[2. Plastic netting as set forth in claim 1 wherein the synthetic resin material comprises a polyolefin.]

3. Plastic netting [as set forth in claim 2 wherein the] *for stretch-wrapping pallet loads, said netting being in the form of a continuous web having strands extending generally longitudinally of the web spaced at intervals transversely of the web and strands extending generally transversely of the web spaced at intervals longitudinally of the web, the netting being formed of a thermoplastic synthetic resin material, the longitudinal and transverse strands being integrally joined at the intersections thereof, the longitudinal strands being elastic to the extent of being stretchable at least 100% when stretched at the rate of 1000% per minute while retaining a sustantial degree of elasticity over a relatively long period of time after having been wrapped around a pallet load with the longitudinal strands extending in the direction of wrap and stretched as the netting is wrapped around the load to bind the load, said* synthetic resin material [comprises] *comprising* a blend of polyolefins.

[4. Plastic netting as set forth in claim 1 wherein the longitudinal strands are elastic to the extent of retaining at least 30% of the initial stress at 100% elongation.]

5. Plastic netting [as set forth in claim 4 wherein] *for stretch-wrapping pallet loads, said netting being in the form of a continuous web having strands extending generally longitudinally of the web spaced at intervals transversely of the web and strands extending generally transversely of the web spaced at intervals longitudinally of the web, the netting being formed of a thermoplastic synthetic resin material, the longitudinal and transverse strands being integrally joined at the intersections thereof, the longitudinal strands being elastic to the extent of being stretchable at least 100% when stretched at the rate of 1000% per minute while retaining a substantial degree of elasticity over a relatively long period of time after having been wrapped around a pallet load with the longitudinal strands extending in the direction of wrap and stretched as the netting is wrapped around the load to bind the load, and wherein the longitudinal strands are elastic to the extent of retaining at least 30% of the initial stress at 100% elongation, and* the longitudinal strands have a tensile strain recovery of at least 30%.

6. Plastic netting as set forth in claim 5 wherein the synthetic resin material comprises a polyolefin.

7. Plastic netting as set forth in claim 6 wherein the synthetic resin material comprises a blend of polyolefins.

8. Plastic netting as set forth in claim 5 wherein the synthetic resin material comprises polybutylene.

9. Plastic netting as set forth in claim 5 wherein the synthetic resin material comprises polyethylene.

10. Plastic netting as set forth in claim 5 wherein the synthetic resin material comprises ethylene vinyl acetate.

11. Plastic netting as set forth in claim 7 wherein the synthetic resin material is a blend of polybutylene and polypropylene.

12. Plastic netting as set forth in claim 11 wherein the synthetic resin material is a blend of about 90% polybutylene and 10% polypropylene by weight.

13. Plastic netting as set forth in claim 7 wherein the synthetic resin material is a blend of low density polyethylene and high density polyethylene.

14. Plastic netting as set forth in claim 13 wherein the synthetic resin material is a blend of about 75% low density polyethylene and 25% high density polyethylene by weight.

15. Plastic netting as set forth in claim 5 wherein the synthetic resin material is a blend of ethylene vinyl acetate and polypropylene.

16. Plastic netting as set forth in claim 15 wherein the synthetic resin material is a blend of about 90% ethylene vinyl acetate and 10% polypropylene by weight.

17. Plastic netting as set forth in claim 5 wherein the transverse strands are substantially thinner than the longitudinal strands.

18. Plastic netting as set forth in claim 17 wherein the diameter of the transverse strands is about 50%–75% of the diameter of the longitudinal strands.

19. Plastic netting as set forth in claim 5 wherein the longitudinal and transverse strands have a diameter in the range from about 0.010 inch to 0.100 inch.

20. Plastic netting as set forth in claim 19 wherein the longitudinal strands are about 0.030–0.050 inch in diameter and the transverse strands are about 0.020–0.040 inch in diameter.

21. Plastic netting as set forth in claim 5 wherein the spacing of the longitudinal strands transversely of the web is in the range from about ¼ inch to 10 inches, and the spacing of the transverse strands longitudinally of the web is in the same range.

22. Plastic netting as set forth in claim 21 wherein the longitudinal strands are spaced about 0.85 inch and the transverse strands are spaced about 1.75 inches.

23. Plastic netting as set forth in claim 22 wherein the synthetic resin material is a blend of about 90% polybutylene and 10% polypropylene by weight and the longitudinal strands are about 0.030–0.050 inch in diameter and the transverse strands are about 0.020–0.040 inch in diameter.

[24. Plastic netting in the form of a continuous web having strands extending generally longitudinally of the web spaced at intervals transversely of the web and strands extending generally transversely of the web spaced at intervals longitudinally of the web, the netting being formed of a thermoplastic synthetic resin material, the longitudinal and transverse strands being integrally joined at the intersections thereof, the transverse strands being substantially thinner than the longitudinal strands, the longitudinal strands being elastic to the extent of being stretchable at least 25% while retaining a substantial degree of elasticity over a relatively long period of time.]

25. The method of stabilizing a load on a pallet comprising wrapping plastic netting [as set forth in claim 1] around the load, *said netting being in the form of a continuous web having strands extending generally longi-*

*tudinally of the web spaced at intervals transversely of the web and strands extending generally transversely of the web spaced at intervals longitudinally of the web, the netting being formed of a thermoplastic synthetic resin material, the longitudinal and transverse strands being integrally joined at the intersections thereof, the longitudinal strands being elastic to the extent of being stretchable at least 100% when stretched at the rate of 1000% per minute while retaining a substantial degree of elasticity over a relatively long period of time after having been wrapped around a pallet load with the longitudinal strands extending in the direction of wrap and stretched as the netting is wrapped around the load to bind the load, said netting being wrapped around the load* with the longitudinal strands of the netting extending in the direction of wrap and, as the netting is wrapped around the load, stretching the longitudinal strands of the netting at least 25%, and securing the netting in place on the load with the longitudinal strands so stretched, thereby to maintain the load bound in place on the pallet, the netting allowing for ventilation of the load.

26. The method of stabilizing a load on a pallet comprising wrapping plastic netting [as set forth in claim 24] around the load, *said netting being in the form of a continuous web having strands extending generally longitudinally of the web spaced at intervals transversely of the web and strands extending generally transversely of the web spaced at intervals longitudinally of the web, the netting being formed of a thermoplastic synthetic resin material, the longitudinal and transverse strands being integrally joined at the intersections thereof, the transverse strands being substantially thinner than the longitudinal strands, the longitudinal strands being elastic to the extent of being stretchable at least 25% while retaining a substantial degree of elasticity over a relatively long period of time after having been wrapped around a pallet load with the longitudinal strands extending in the direction of wrap and stretched as the netting is wrapped around the load to bind the load, said netting being wrapped around the load* with the longitudinal strands of the netting extending in the direction of wrap and, as the netting is wrapped around the load, stretching the longitudinal strands of the netting at least 25%, and securing the netting in place on the load with the longitudinal strands so stretched, thereby to maintain the load bound in place on the pallet, the netting allowing for ventilation of the load.

27. A pallet load wrapped with plastic netting [as set forth in claim 1], *said netting being in the form of a continuous web having strands extending generally longitudinally of the web spaced at intervals transversely of the web and strands extending generally transversely of the web spaced at intervals longitudinally of the web, the netting being formed of a thermoplastic synthetic resin material, the longitudinal and transverse strands being integrally joined at the intersections thereof, the longitudinal strands being elastic to the extent of being stretchable at least 100% when stretched at the rate of 1000% per minute while retaining a substantial degree of elasticity over a relatively long period of time after having been wrapped around a pallet load with the longitudinal strands extending in the direction of wrap and stretched as the netting is wrapped around the load to bind the load, said netting being wrapped around the load* with the longitudinal strands of the netting extending in the direction of wrap and stretched at least 25%, thereby maintaining the load bound in place on the pallet while allowing for ventilation of the load.

28. A pallet load wrapped with plastic netting [as set forth in claim 24], *said netting being in the form of a continuous web having strands extending generally longitudinally of the web spaced at intervals transversely of the web and strands extending generally transversely of the web spaced at intervals longitudinally of the web, the netting being formed of a thermoplastic synthetic resin material, the longitudinal and transverse strands being integrally joined at the intersections thereof, the transverse strands being substantially thinner than the longitudinal strands, the longitudinal strands being elastic to the extent of being stretchable at least 25% while retaining a substantial degree of elasticity over a relatively long period of time after having been wrapped around a pallet load with the longitudinal strands extending in the direction of wrap and stretched as the netting is wrapped around the load to bind the load, said netting being wrapped around the load* with the longitudinal strands of the netting extending in the direction of wrap and stretched at least 25%, thereby maintaining the load bound in place on the pallet while allowing for ventilation of the load.

*29. Plastic netting in the form of a continuous web having strands extending generally longitudinally of the web spaced at intervals transversely of the web and strands extending generally transversely of the web spaced at intervals longitudinally of the web, the netting being formed of a thermoplastic synthetic resin material comprising a blend consisting of a major proportion of polybutylene and a minor proportion of polypropylene, the longitudinal and transverse strands being integrally joined at the intersections thereof, the longitudinal strands being elastic to the extent of being stretchable at least 100% when stretched at the rate of 1000% per minute while retaining a substantial degree of elasticity over a relatively long period of time, being elastic to the extent of retaining at least 30% of the initial stress at 100% elongation, and having a tensile strain recovery of at least 30%.*

*30. Plastic netting as set forth in claim 29 wherein the synthetic resin material is a blend of about 90% polybutylene and 10% polypropylene by weight.*

*31. Plastic netting as set forth in claim 30 wherein the longitudinal strands are about 0.030–0.050 inch in diameter, the transverse strands are about 0.020–0.040 inch in diameter, the spacing of the longitudinal strands transversely of the web is in the range from about ¼ inch to 10 inches, and the spacing of the transverse strands is in the same range.*

*32. Plastic netting as set forth in claim 31 wherein the longitudinal strands are spaced about 0.85 inch and the transverse strands are spaced about 1.75 inches.*

* * * * *